United States Patent [19]

Smith et al.

[11] Patent Number: 5,557,999
[45] Date of Patent: Sep. 24, 1996

[54] METHOD FOR MANUFACTURING A TAMPER-INDICATING PLASTIC CLOSURE

[75] Inventors: David W. Smith, Waynetown; Ramesh Kamath, Brownsburg, both of Ind.

[73] Assignee: H-C Industries, Inc., Crawfordsville, Ind.

[21] Appl. No.: 182,627

[22] Filed: Jan. 14, 1994

[51] Int. Cl.$^6$ ................................................. B65D 41/34
[52] U.S. Cl. ........................... 83/880; 53/296; 82/101; 82/169; 83/54; 83/418; 413/10; 414/225; 414/783
[58] Field of Search ................... 83/880, 879, 54, 83/418; 82/1.11, 47, 101, 168, 169; 215/252, 253, 258; 264/154; 414/757, 783, 225; 425/290, 291; 413/10, 15, 17; 53/296, 367, 488; 269/48.1, 48.2

[56] References Cited

U.S. PATENT DOCUMENTS

| | | | |
|---|---|---|---|
| 4,343,754 | 8/1982 | Wilde et al. | 264/154 |
| 4,378,893 | 4/1983 | Wilde et al. | 215/246 |
| 4,398,875 | 8/1983 | Kawashima et al. | 425/809 X |
| 4,497,765 | 2/1985 | Wilde et al. | 264/268 |
| 4,666,053 | 5/1987 | Corcoran et al. | 215/252 |
| 4,744,480 | 5/1988 | Luch et al. | 215/252 |
| 4,904,435 | 2/1990 | Babcock et al. | 264/154 |
| 4,938,370 | 7/1990 | McBride | 215/252 |
| 4,978,017 | 12/1990 | McBride | 215/252 |

FOREIGN PATENT DOCUMENTS

WO93/00270  1/1993  WIPO.

OTHER PUBLICATIONS

Drawing No. 204107, Assembly, Upper Scoring Tool, H-C Industries, Inc.

Primary Examiner—Kenneth E. Peterson
Assistant Examiner—Clark F. Dexter
Attorney, Agent, or Firm—Dressler, Goldsmith, Shore & Milnamow, Ltd.

[57] ABSTRACT

A method and apparatus for manufacturing a plastic closure particularly to facilitate orientation of the closure so that a manufacturing process, such as vertical scoring, can be effected at one of at least one predetermined portion of the closure. Such orientation is achieved by the provision of an orientation mandrel on to which the closure is moved. The closure is initially rotated relative to the orientation mandrel, with a stop mechanism of the mandrel thereafter engaging the closure and stopping such relative rotation. The stop mechanism of the mandrel is configured in a predetermined orientation with respect to an associated component of the apparatus, which in the illustrated embodiment comprises a vertical scoring mechanism. By this manufacturing technique, a closure having a tamper-indicating pilfer band can be scored and cut at a particular portion of the band, such as between container-engaging projections of the pilfer band.

10 Claims, 6 Drawing Sheets

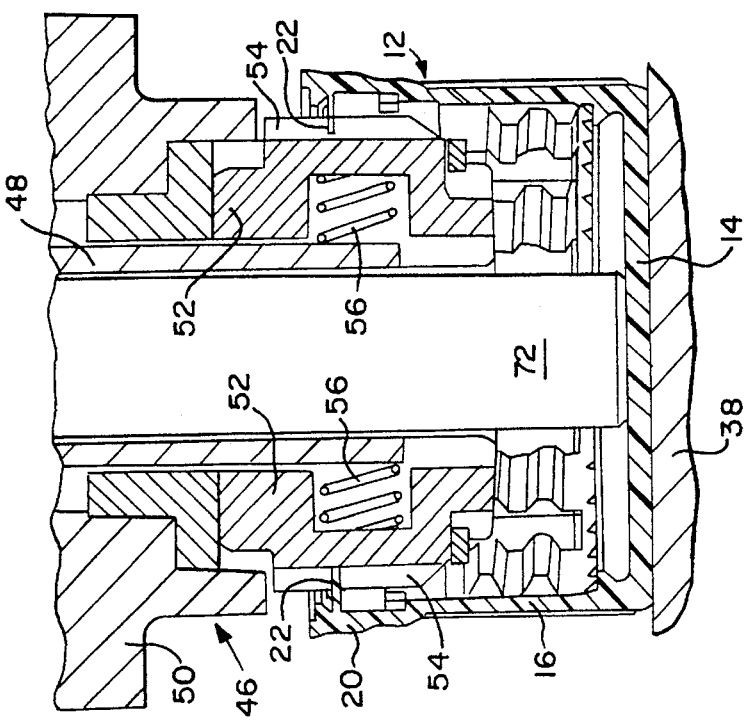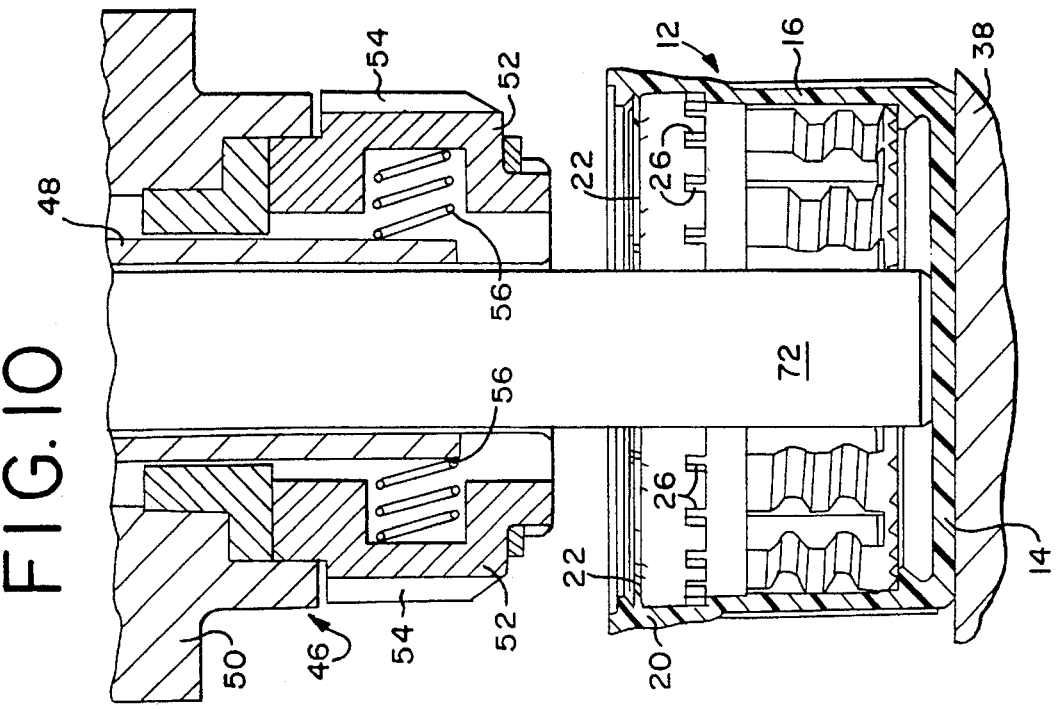

METHOD FOR MANUFACTURING A TAMPER-INDICATING PLASTIC CLOSURE

TECHNICAL FIELD

The present invention relates generally to a method and apparatus for manufacturing a tamper-indicating plastic closure for a container, and more particularly to a method and apparatus for orienting a molded plastic closure during handling thereof to facilitate subsequent manufacturing steps, such as scoring and cutting of one or more predetermined portions of a pilfer band of the closure.

BACKGROUND OF THE INVENTION

Molded plastic closures such as for use on containers for carbonated beverages and the like have met with extremely widespread acceptance in the marketplace. Commonly-assigned U.S. Pat. Nos. 4,378,893 and 4,343,754 disclose closures of this type, and highly efficient techniques for manufacture thereof. U.S. Pat. No. 4,497,765 discloses further techniques for manufacturing such closures, including manufacture of closures each having a tamper-indicating pilfer band. Each of the above-referenced patents is hereby incorporated by reference.

U.S. Pat. Nos. 4,938,370, and 4,978,017, both hereby incorporated by reference, each illustrate a plastic closure generally of the above type, with a tamper-indicating plastic pilfer band particularly configured for highly reliable and consistent tamper-indication. The pilfer band constructions disclosed in these two patents include pilfer bands which are at least partially detachably connected to an annular skirt portion of the closure, with a plurality of circumferentially spaced, inwardly extending projections provided for engagement with an annular locking ring of an associated container.

For some applications, it is desired that the pilfer band remain on the container after closure removal, and to this end, a suitable fracturable connection is provided between the pilfer band and the skirt portion of the closure so that the pilfer band entirely separates from the skirt portion. In contrast, for some applications (such as for returnable, reusable containers) it is desired that the pilfer band remain partially connected to the skirt portion of the closure, while portions of the pilfer band fracturably separate from the skirt portion to provide the desired visible indication of opening. For such applications, it is desirable to form the closure such that at least one portion of the pilfer band splits vertically, with the one or more band segments thus formed remaining joined to the skirt portion of the closure by at least one integral connector portion. U.S. Pat. No. 4,666,053, hereby incorporated by reference, illustrates one embodiment of such a closure, and a method of vertically scoring the closure pilfer band. U.S. patent application Ser. No. 07/958,014, filed Oct. 7, 1992, now U.S. Pat. No. 5,230,234, hereby incorporated by reference, illustrates a presently preferred configuration for such vertical scoring, including a pair of staggered vertical scores.

Experience has shown that consistent tamper-indication, and in particular consistent resistance to pilfer band fracture, or "pull strength", is facilitated by always positioning the vertical scoring of the pilfer band between adjacent ones of the inwardly extending projections of the band. This is in contrast to random disposition of the vertical scoring either between the projections, or in the region of, and partially or completely through, one of the projections. Heretofore, this preferred vertical scoring between the projections has not been possible during high-speed manufacture, since the closures are randomly oriented about their respective vertical axes during handling and scoring.

The present invention is directed to a method and apparatus for handling a closure during manufacture such that the closure is oriented in a predetermined orientation relative to the vertical axis of the closure, thus facilitating subsequent processing, such as vertical scoring of one or more predetermined portions of the closure pilfer band.

SUMMARY OF THE INVENTION

The method and apparatus of the present invention facilitate manufacture and handling of a plastic closure, and in particular a tamper-indicating closure, by orienting the closure in a predetermined orientation relative to an associated mandrel assembly. The mandrel assembly, in turn, is arranged in a predetermined relationship to an associated processing mechanism, which in the illustrated embodiment comprises an arrangement for vertically scoring the pilfer band of the closure. Thus, scoring of the closure pilfer band at a predetermined portion thereof, such as between adjacent container-engaging projections of the pilfer band, is readily and consistently achieved.

In accordance with the illustrated embodiment, a method of handling a plastic closure includes providing a closure having a top wall portion and a depending annular skirt portion, and providing an orientation mandrel which includes at least one movable stop dog engageable with the closure. The present method contemplates that the closure is positioned in operative association with the orientation mandrel, and thereafter the closure and mandrel relatively rotated until the closure is positioned in a predetermined orientation with respect to the mandrel. In this predetermined orientation, the stop dog engages the closure to stop relative rotation of the mandrel and the closure, with the closure now oriented with respect to associated processing devices in an orientation which corresponds to the relative orientation of the stop dog of the orientation mandrel.

In the preferred practice of the present method, the closure and the mandrel are positioned in coaxial relationship, with the stop dog of the mandrel biased generally radially from a first position during positioning of the closure in association with the mandrel, to a second position in which the stop dog engages the closure to stop relative rotation of the closure and the mandrel.

In the preferred practice of the present invention, the closure is scored (i.e., cut) at one of at least one predetermined portion of the closure. This predetermined portion corresponds in a predetermined relationship (such as in alignment) to the relative position of the stop dog after engagement of the stop dog with the closure to stop rotation relative to the mandrel. Again, once rotation of the closure with respect to the mandrel is stopped, the closure has been positioned in a predetermined orientation relative to the mandrel; subsequent processing can be referenced with respect to the stop dog of the mandrel, with the assurance that such processing will be effected on the desired portion of the now-oriented closure.

The illustrated embodiment of the present invention is a scoring apparatus for high-speed scoring of molded plastic closures supplied to the apparatus. The scoring apparatus includes a rotatable carousel, with each of a plurality of orientation mandrels in accordance with the present invention carried by the carousel for rotation about the respective vertical axes of the mandrels. For this purpose, the apparatus includes an internally toothed ring gear, with each orientation mandrel provided with a spur gear in engagement with the ring gear. By this construction, rotation of the carousel relative to the ring gear coaxially rotates the spur gear and the mandrel.

The stop dog of the orientation mandrel is positioned in a predetermined relationship relative to the respective spur gear. In turn, the vertical scoring mechanism of the apparatus is positioned in a predetermined relationship with respect to the ring gear. By this arrangement, the stop dog of the mandrel is rotatably positioned in a predetermined orientation relative to the vertical scoring mechanism as the mandrel is moved relative to the scoring mechanism by the carousel, and as the spur gear and mandrel coaxially rotate. Stated differently, the stop dog of the mandrel and the associated vertical scoring mechanism are arranged such that the position of the stop dog relative to the scoring mechanism is known and predetermined. This is achieved by predetermined relative positioning of the stop dog and spur gear, predetermined relative positioning of the scoring mechanism and ring gear, and the predetermined gear ratio of the spur gear and ring gear. Thus, once the closure is initially relatively rotated with respect to the mandrel such that it is brought into the desired relative orientation, and relative rotation is stopped by the stop dog, the orientation of the closure with respect to the scoring mechanism is also known and predetermined.

The illustrated apparatus embodying the present invention includes a pair of diametrically opposed stop dogs on each orientation mandrel, with the stop dogs both spring-biased generally radially outwardly from a first position (where rotation of the closure relative to the mandrel is accommodated), to a second position, wherein the stop dogs engage the closure and prevent rotation relative to the mandrel. This illustrated embodiment facilitates disposition of a stop rib of each stop dog between adjacent ones of the inwardly extending projections of the closure pilfer band, which in turn facilitates subsequent vertical scoring of the closure between adjacent ones of the pilfer band projections.

Other features and advantages of the present invention will become readily apparent from the following detailed description, the accompanying drawings, and the appended claims.

BRIEF DESCRIPTION OF THE DRAWINGS

FIGS. 10 and 11 are relatively enlarged cross-sectional views further illustrating orientation of a plastic closure with respect to an orientation mandrel of the present invention.

DETAILED DESCRIPTION

Figure 1:
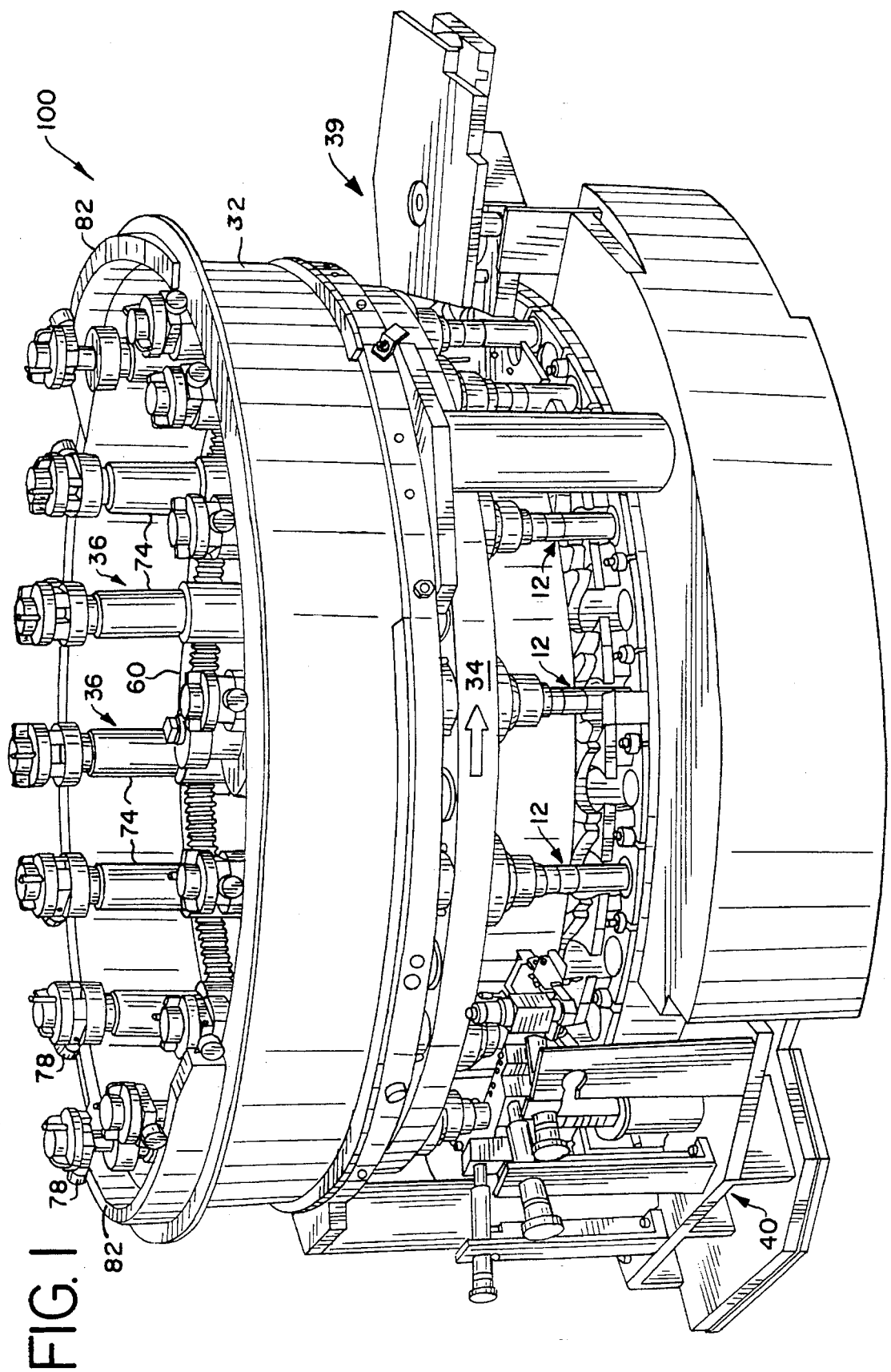
FIG. 1 is a perspective view of a closure scoring apparatus embodying the principles of the present invention.
Figure 2:
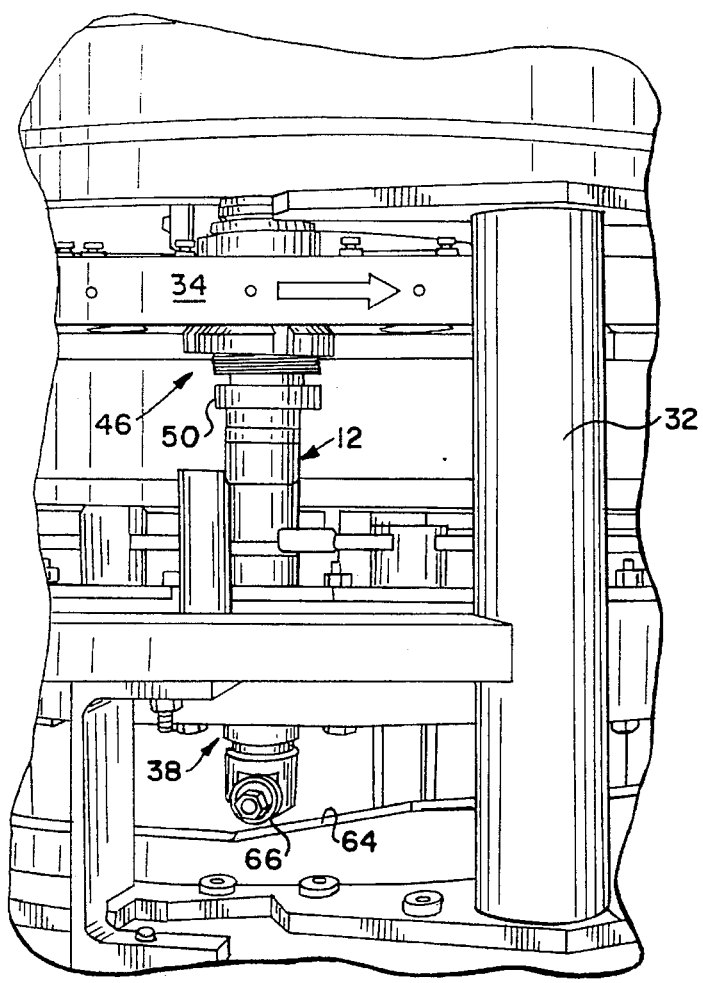
FIG. 2 is a fragmentary perspective view of the scoring apparatus illustrated in FIG. 1.
Figure 3:
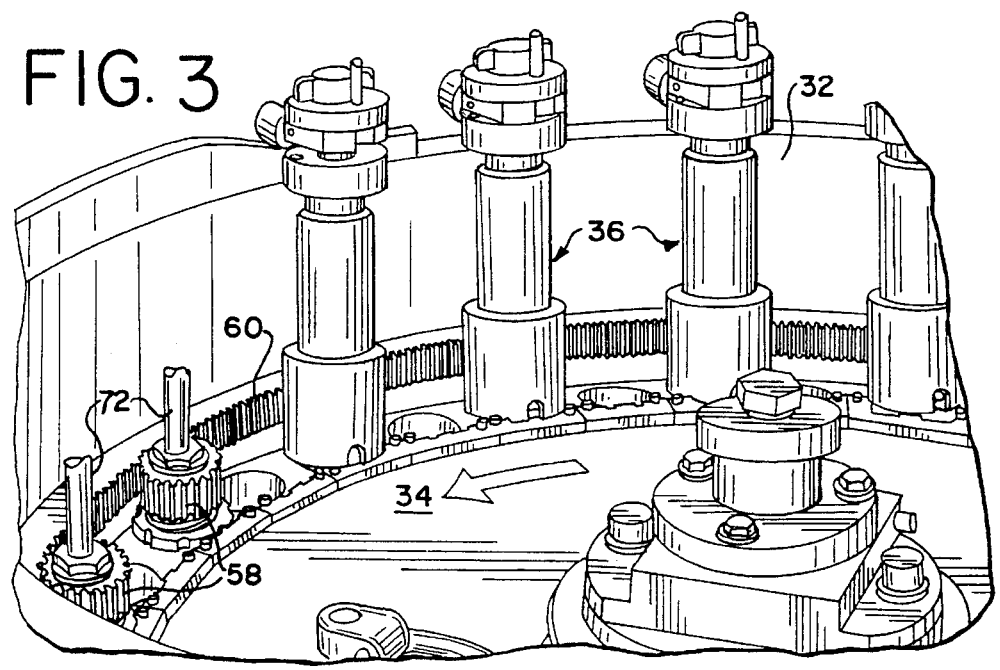
FIG. 3 is a fragmentary perspective view, partially cut-away, of the scoring apparatus illustrated in FIG. 1.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

FIG. 1 illustrates a scoring apparatus 10 embodying the principles of the present invention. As will be further described, scoring apparatus 10 is particularly suited for handling molded plastic closures 12 (see FIGS. 6 and 9) during manufacture thereof, and in particular for scoring and cutting such closures whereby a pilfer band of each closure is rendered fracturable and separable from the remaining portions of the closure to provide the desired readily discernable visible evidence of opening.

Figure 9:
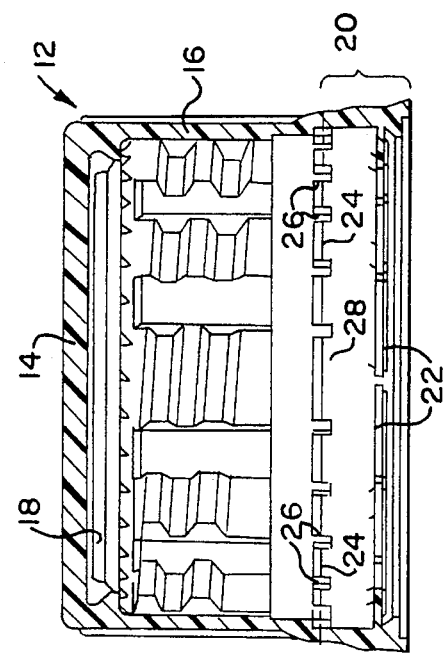
FIG. 9 is a cross-sectional view of the tamper-indicating plastic closure illustrated in FIG. 6.
Figure 6:
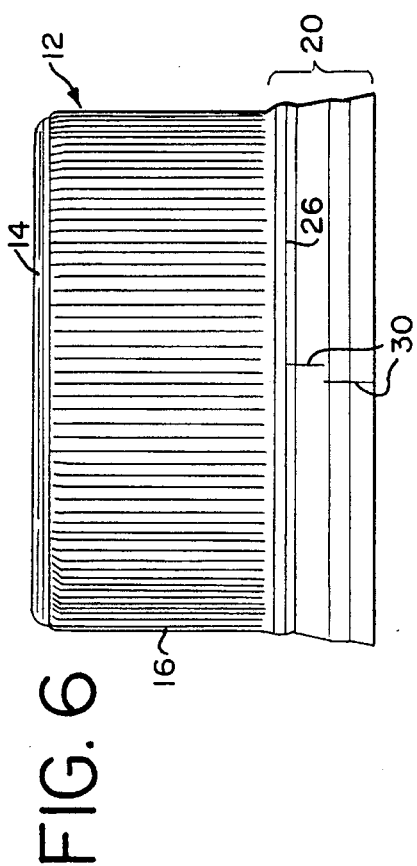
FIG. 6 is an elevational view of a tamper-indicating plastic closure of the type which can be processed in accordance with the present invention.

With reference first to FIGS. 6 and 9, an understanding of the present invention will be facilitated by description of the type of plastic closure 12 for which the present invention is particularly suited for manufacture. Plastic closure 12 includes a top wall portion 14 and an annular, generally cylindrical depending skirt portion 16 having an internal thread formation thereon. A sealing liner 18 can be provided adjacent the top wall portion 14 for providing the desired sealing cooperation with an associated container.

Closure 12 includes a pilfer band 20 configured in accordance with the above-incorporated U.S. Pat. No. 4,938,370. The pilfer band 20 includes a plurality of circumferentially spaced, inwardly extending flexible projections 22 which are engageable with an annular locking ring of an associated container. Notably, pilfer band 20 is configured to provide two distinct modes of interfering cooperation with an associated container, thus providing extremely reliable and consistent tamper-indication.

The pilfer band 20 is partially distinguished from the skirt portion 16 of the closure by a circumferentially extending horizontal score line 24. The score line 24 extends substantially through the side of the closure, and partially into a plurality of circumferentially spaced internal frangible bridges or ribs 26. By this construction, each unscored portion of the partially scored bridges 26 provides a fracturable "residual" portion, with these fracturable residual portions collectively detachably connecting the pilfer band 20 to the skirt portion 16. In this embodiment, configured for those applications where it is desired that the pilfer band remain connected to the skirt portion after closure removal, an integral, unscored connector portion 28 is provided which does not fracture during closure removal, thus joining the pilfer band and the skirt portion after fracture of fracturable bridges 26.

In order to facilitate convenient removal of the closure, including partially detached pilfer band 20, from an associated container, it is preferred that the pilfer band 20 fracture and split into one or more band segments. To this end, a pair of staggered vertical scores 30 (FIG. 6) are provided in the pilfer band with another fracturable residual portion thus defined in the region generally between the vertical scores 30. In a presently preferred embodiment, the vertical scores 30 can be positioned in substantially diametrically opposed relationship to the connector portion 28, with the pilfer band 20 thus assuming a "gull wing" like configuration as the band splits at vertical scores 30 into two band segments extending from respective opposite sides of the connector portion 30.

Experience has shown that desired consistency in resistance to pilfer band fracture (sometimes referred to as "pull strength") is best achieved by consistently positioning the vertical scoring of the pilfer band between adjacent ones of the inwardly extending projections 22. The apparatus and method of the present invention are particularly suited for effecting such positioning of the vertical scoring. However, it is to be understood that the principles disclosed herein can be employed for positioning and orienting a closure during handling and manufacture for other purposes.

With particular reference to FIGS. 1–5, and 10 and 11, the scoring apparatus 10 includes a frame 32 with respect to which a rotatably driven carousel 34 rotates. The carousel 34 carries a plurality of circumferentially spaced mandrel assemblies 36 positioned generally at the periphery of the carousel, and further carries and rotates a corresponding number of respective closure support assemblies 38. The mandrel assemblies 36 and the support assemblies 38 respectively cooperate for receiving molded closures from an associated supply, and thereafter orienting and scoring each closure to render the pilfer band 20 of each closure fracturable for tamper-indication. The closures are thereafter discharged from the apparatus, with the desired scoring being effected attendant to one cycle or revolution of each cooperating mandrel assembly and support assembly about the apparatus 10 by the carousel 34.

Closures are supplied to, and received from, the scoring apparatus at a suitable feed/discharge station 39 (FIG. 1). Scoring of the closures is effected by suitable scoring knives mounted at a scoring station 40 (FIG. 1) with the scoring station including a vertical scoring knife mechanism 42 (see FIG. 5) for effecting vertical scoring of the pilfer band, such as formation of vertical scores 30. Above-incorporated U.S. Pat. No. 4,666,053 illustrates a scoring knife mechanism such as may be employed for vertical scoring of the plastic closures.

With further reference to FIGS. 4, 5, 10, and 11, each mandrel assembly 36 includes a rotatable orientation mandrel 46 rotatably mounted on the carousel 34. Each mandrel 46 includes a rotatable mandrel shaft 48, supported by suitable bearings, with an annular support ring 50 mounted generally at the lower end of the mandrel shaft. Each mandrel 46 further includes, in accordance with the present invention, at least one, and preferably a pair of spring-biased stop dogs 52, each having a respective vertically oriented stop rib 54. The stop dogs 52 are biased generally radially outwardly of the mandrel, with the stop ribs 54 being positionable between adjacent ones of the projections 22 of the closure pilfer band 20, as will be further described.

In accordance with the present invention, the stop dogs 52 are positioned in a predetermined relationship with respect to the mandrel shaft 48, which in turn is positioned in a predetermined relationship with respect to a spur gear 58. The spur gear 58 of each mandrel assembly is in engagement with an internally-toothed ring gear 60 which extends generally about the periphery of the frame 32 of the scoring apparatus 10 (see FIGS. 1 and 3), with rotation of carousel 34 with respect to ring gear 60 acting to rotate each mandrel 46 about its own vertical axis.

The scoring apparatus 10 is configured such that each stop dog 52 is positioned in a predetermined relationship to the respective spur gear 58. In turn, the vertical scoring mechanism 42 is positioned in a predetermined relationship with respect to ring gear 60. The number of teeth on each of the ring gear and spur gear are selected to be evenly divisible, such that each rotatable mandrel rotates through an integral number of rotations, about its own axis, attendant to each single revolution or rotation of the carousel 34. In a current embodiment, each mandrel goes through 17 complete revolutions during each revolution of the carousel 34, with ring gear 60 having 408 teeth, and each spur gear 58 having 24 teeth.

As will be appreciated, this arrangement of the gearing acts to rotatably position each stop dog 52 in a predetermined orientation relative to the vertical scoring mechanism 42 as the mandrel is moved relative to the scoring mechanism by the carousel 34, and as the spur gear and mandrel coaxially rotate. It is this "indexing" of each orientation mandrel, including its stop dogs 54, which facilitates effecting vertical scoring on at least one predetermined portion of each closure, such as between adjacent ones of the projections 22. Once each closure is positioned on a respective orientation mandrel in a known relative position, scoring (or other processing) of each closure can be effected in a predetermined, consistent, and repeated nonrandom manner.

In a current embodiment, the scoring mechanism is positioned with respect to ring gear 60 such that vertical scoring of a closure is effected at a portion between adjacent ones of the projections 22, which portion is aligned with one of the stop dogs 54. As will be appreciated, however, the illustrated closure, including twelve of the projections 22, likewise includes twelve portions at which vertical scoring could be effected, with each of these portions positioned in a predetermined relationship with respect to the stop dogs 52 after the stop dogs engage the closure and stop relative rotation of the closure and the orientation mandrel. Moreover, it is within the purview of the present invention to configure each closure to include a feature (such as by molding in) which can be configured for engagement with the orientation mandrel such that a single portion of the closure can be oriented and subsequently scored or otherwise processed.

Each closure 12 is positioned in operative association with a respective orientation mandrel 46, and thereafter positioned in a predetermined orientation with respect to the mandrel by relatively rotating the closure and the mandrel. Attendant to such relative rotation, the spring-biased stop dogs 52 of each mandrel slip on the projections 22 until they locate the gaps between the projections, then spring out and engage the closure by disposition of the respective stop ribs between adjacent ones of the pilfer band projections 22, thereby stopping relative rotation of the closure and the mandrel. The closure and the mandrel thereafter rotate together, with the above-described known orientation of the stop dogs with respect to the vertical scoring mechanism 42 thus permitting consistent scoring of the closure between adjacent pilfer band projections 22.

In order to position each closure 12 in the desired operative association with a respective orientation mandrel 46, the scoring apparatus includes a lower cam 64 (FIG. 2) mounted on frame 32 which acts to move each closure upwardly with respect to the vertically spacially fixed mandrel 46. In this regard, and as will be further described, gripping projections 68 (FIGS. 7 and 8) on the lower face of the orientation mandrel cooperate with the support assembly 38, which is preferably suitably spring-biased, for gripping the closure during horizontal and vertical scoring.

In order to effect the initial relative rotation of each closure 12 relative to its respective orientation mandrel, each mandrel assembly 36 includes a vertically movable hold-down plunger 72 arranged coaxially with the respective orientation mandrel 46. Each hold-down plunger 72 is vertically movable with respect to an outer casing 74 of the mandrel assembly 36, with each hold-down plunger urged toward the position illustrated in FIG. 4 by a compression spring 76 of the mandrel assembly. Upward movement of the hold-down plunger, in opposition to the compression spring 76, is effected via an upper cam follower 78, mounted on a follower arm 80 operatively connected to the hold-down plunger 72, with a pair of upper cams 82 mounted on frame 32 (see FIGS. 1 and 5) effecting vertical movement of each hold down plunger 72.

A cycle of operation of the present apparatus will now be described.

Figure 4:
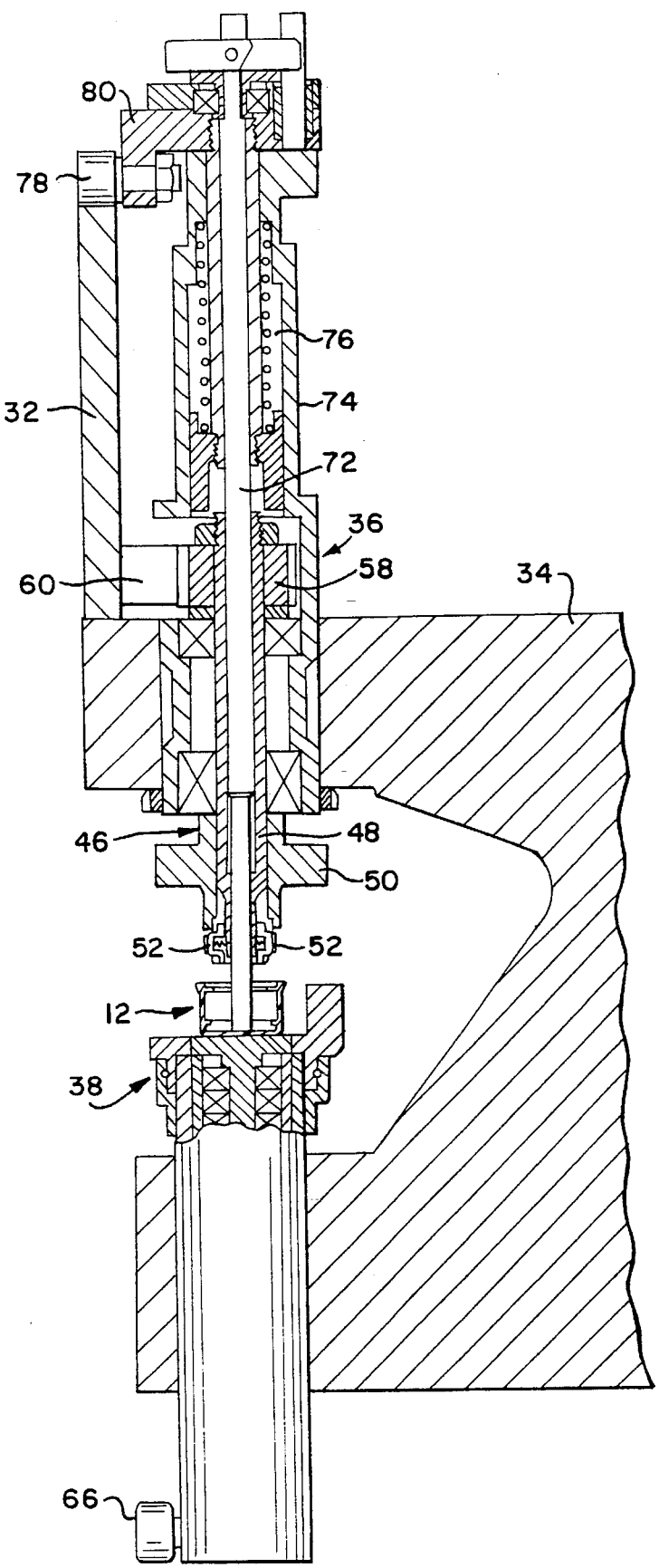
FIGS. 4 and 5 are cross-sectional views illustrating mandrel and support assemblies of the present apparatus which are mounted on a rotatable carousel of the apparatus.
Figure 5:
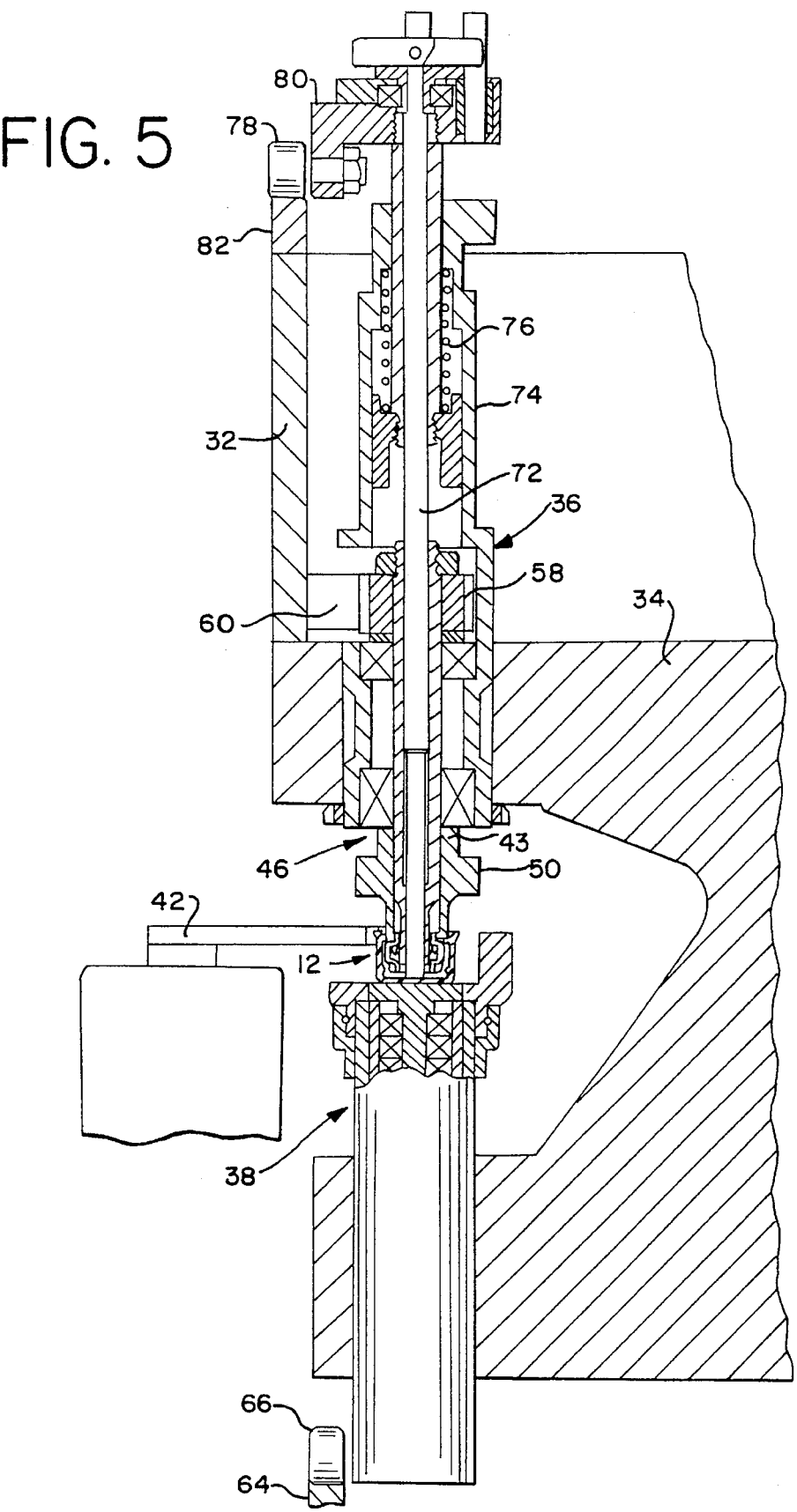

As a closure is introduced into the apparatus at feed/discharge station 39, the closure is received on closure support assembly 38, and hold-down plunger 72 of the respectively associated mandrel assembly 36 is lowered into the closure and into engagement with the inside surface of top wall portion 14. FIGS. 4 and 10 generally illustrate this condition of the closure within the apparatus. During this portion of the cycle, the hold-down plunger, under the influence of its compression spring 76 urges the closure against the closure support assembly 38. The closure is thus held against rotation relative to the orientation mandrel 46, which is being rotatably driven by virtue of engagement of its spur gear 58 with ring gear 60 as the mandrel assembly is moved by the carousel 34.

Orientation of the closure 12 with respect to the mandrel 46 is now effected. Closure support assembly 38 is raised by the action of cam follower 66 against lower cam 64, raising the closure toward and onto the orientation mandrel 46. As the closure is raised, in opposition to spring-biased hold-down plunger 72, the closure is moved into operative association with the orientation mandrel with stop dogs 54 being urged inwardly as they engage the projections 22 of the closure pilfer band 20. As best illustrated in FIG. 10, the lower ends of stop ribs 54 are preferably suitably angled to facilitate inward movement of the stop dogs 52 as the closure 12 is guided onto the orientation mandrel.

Figure 7:
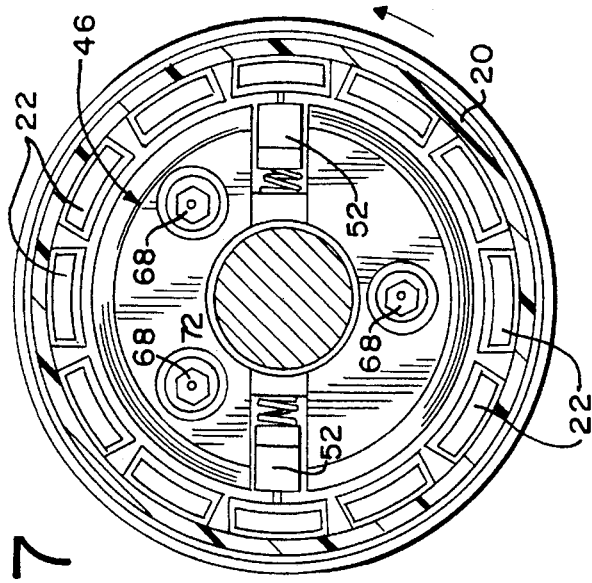
FIGS. 7 and 8 are diagrammatic views illustrating orientation of a plastic closure with respect to an orientation mandrel of the present invention.
Figure 8:
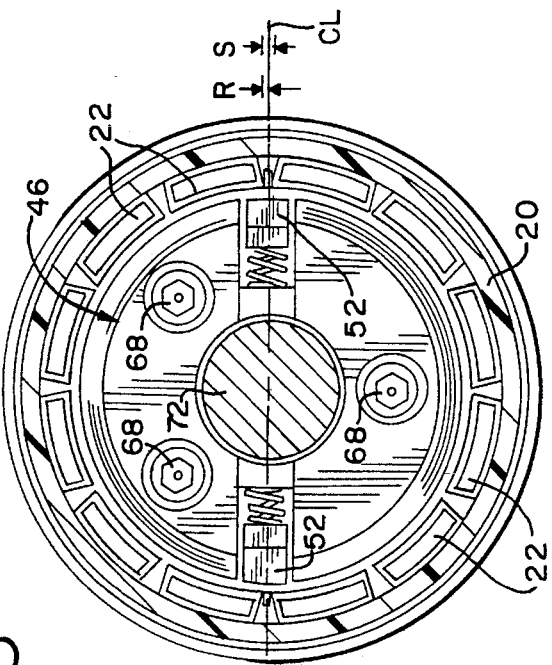

FIGS. 7 and 8 illustrate the relative rotation, and resultant orientation, of the mandrel 46 and the pilfer band 20 of the closure 12. In FIG. 7, it will be observed that stop dogs 52 are in their inward, first position, in opposition to the respective biasing springs, with the closure rotating relative to the mandrel, as the mandrel is driven by spur gear 58, and the closure is held against such rotation by hold-down plunger 72.

FIG. 8 illustrates the oriented position of the closure with respect to the mandrel 46 after the closure has rotated relative to the mandrel, and stop dogs 52 have moved generally radially outwardly to engage the closure, and stop its rotation relative to the mandrel. As will be observed, the stop ribs 54 of the stop dogs are positioned between adjacent ones of the pilfer band projections 22. In this regard, and depending upon the specific dimensions of the closure, it can be desirable to offset each stop rib 54 with respect to the radial centerline of the stop dog. In this way, the radial centerline of the stop dog can be used as the line of reference with which the respective spur gear 58 is oriented, thus assuring that this line of reference is aligned with the center of the region between adjacent projections 22. As will be appreciated, the stop rib 54 must have a thickness less than the spacing between adjacent projections 22 to assure that the rib moves into position between adjacent projections to stop relative rotation of the closure and mandrel. In a current embodiment, spacing between adjacent projections 22 is on the order of 0.028 inches (dimension S in FIG. 8), while each stop rib 54 has a thickness of only 0.016 inches (dimension R) to assure that it falls into the region between adjacent projections 22. As shown, the stop rib 54 is preferably offset on the stop dog (in a counter-clockwise direction referring to the orientation of FIG. 8), with this offset being on the order of 0.006 inches with respect to the radial centerline C. L of the stop dog.

Now that the closure 12 is positioned on the mandrel 46, and rotating coaxially therewith as the spur gear 58 is rotated along ring gear 60 by movement of carousel 34, it is preferred that the hold-down plunger 72 be moved upwardly to relieve its frictional engagement with the closure cap, and thus prevent undesired deformation of the cap since it no longer needs to be held against rotation together with the mandrel 46. It will be appreciated, there are some instances when the closure will be moved onto the mandrel 46 such that the stop ribs immediately fall between adjacent ones of the projections 22, thus immediately placing the closure in the desired orientation on the mandrel 46. However, because the majority of the inner surface of the pilfer band has the projections 22 extending inwardly therefrom, in most instances, the closure 12 will be subjected to some relative rotation with respect to the mandrel until the desired engagement of the stop dogs with the closure. As will be further appreciated, the extent of such relative rotation will ordinarily be limited to an angle which corresponds to the circumferential extent of one of the projections 22; after this amount of relative rotation, the stop dogs 52 will invariably move outwardly to their second positions and engage the closure 12 for stopping rotation relative to the mandrel.

During scoring of the closure, it is preferred that the closure be held against rotation relative to the mandrel, thus rotating with the mandrel during scoring. Accordingly, the closure support assembly 38 is moved upwardly relative to the mandrel 46, thus urging the closure 12 upwardly so that its pilfer band is moved to extend about support ring 50 of the mandrel. Attendant to this action, the stop ribs 54 move to a position generally beneath the pilfer band projections 22 (and therefore no longer act to stop relative rotation of the closure and mandrel) with the preferably spring-biased support assembly 38 urging the closure against gripping projections 68 on the face of the mandrel 46 to hold the closure against relative rotation during scoring. Because the spring-biased surface of the support assembly 38 which engages the top wall portion 14 is rotatably mounted, this surface rotates with the closure, and the mandrel 46, as they are driven via the spur gear 58 and ring gear 60 by the rotating movement of the carousel 34.

As the closure 12 is moved past the scoring station 40, one or more horizontal scoring knives form horizontal score 26, with one or more vertical scoring knives of vertical scoring mechanism 42 effecting vertical scoring of the pilfer band between adjacent ones of the projections 22. Supporting ring 50 of the mandrel provides a "reference" surface against which the preferably spring-biased mounting elements for the scoring knives are urged, thus controlling the depth to which the closure is scored. After scoring, the support assembly 38 is lowered, and hold-down plunger 72 released (by movement of upper cam follower 78 off of one of the upper cams 82) so that the closure is pushed off of the mandrel 46, and discharged from the scoring apparatus at feed/discharge station 39.

From the foregoing, it will be observed that numerous modifications and variations can be effected without departing from the true spirit and scope of the novel concept of the present invention. It will be appreciated that no limitation with respect to the specific embodiment illustrated herein is intended or should be inferred. The disclosure is intended to cover, by the appended claims, all such modifications as fall within the scope of the claims.

What is claimed is:

1. A method of handling a plastic closure, comprising the steps of:

providing a plastic closure having a top wall portion and a depending annular skirt portion;

providing an orientation mandrel including stop means for engaging said closure to stop rotation of said closure relative to said orientation mandrel, said stop means being engageable with said closure by movement of said stop means generally radially of said mandrel;

positioning said closure in operative association with said mandrel and relatively rotating said mandrel and said closure with respect to each other until said closure is positioned in a predetermined orientation with respect to said mandrel whereupon said stop means engage said closure by the movement of said stop means generally radially of said mandrel to stop relative rotation of said mandrel and said closure with respect to each other.

2. A method of handling a plastic closure in accordance with claim 1, wherein said positioning step includes positioning said closure and said mandrel in coaxial relationship with each other.

3. A method of handling a plastic closure in accordance with claim 2, including biasing said stop means from a first position of said stop means during said positioning of said closure in association with said mandrel, to a second position in which said stop means engages said closure to stop relative rotation of said closure and said mandrel with respect to each other.

4. A method of handling a plastic closure in accordance with claim 1, and scoring said closure at one of at least one predetermined portion of said closure, said at least one predetermined portion of said closure corresponding in predetermined relationship to the relative position of said stop means after engagement of said stop means with said closure to stop rotation of said closure relative to said mandrel.

5. A method of manufacturing a plastic closure, comprising the steps of:

providing a plastic closure having a top wall portion, a depending annular skirt portion, and an annular pilfer band;

providing a closure scoring apparatus including a rotatable carousel, and at least one orientation mandrel carried by said carousel, wherein said mandrel includes stop means for engaging said closure to stop rotation of said closure relative to said orientation mandrel, said stop means being engageable with said closure by movement of said stop means generally radially of said mandrel;

positioning said closure in operative association with said mandrel, and relatively rotating said mandrel and said closure with respect to each other as said mandrel is carried by said rotatable carousel, said closure and said mandrel being relatively rotated until said stop means engages said closure by the movement of said stop means generally radially of said mandrel to stop rotation relative to said mandrel, and scoring said closure with scoring means of said closure scoring apparatus, including scoring said closure at one of at least one predetermined portion of said pilfer band of said closure, said at least one predetermined portion of said closure corresponding in predetermined relationship to the relative position of said stop means after engagement of said stop means with said closure to stop rotation relative to said mandrel with respect to each other.

6. A method of manufacturing a plastic closure in accordance with claim 5, wherein the step of relatively rotating said mandrel and said closure includes rotating said mandrel about its axis as said mandrel is carried by said rotatable carousel, said stop means of said mandrel being rotatably positioned in a predetermined orientation relative to said scoring means as said mandrel is moved relative to said scoring means by said carousel.

7. A method of manufacturing a plastic closure in accordance with claim 6, including providing a ring gear on said scoring apparatus, and providing said mandrel with a spur gear in engagement with said ring gear, so that rotation of said carousel relative to said ring gear coaxially rotates said spur gear and sand mandrel, said stop means being positioned in a predetermined relationship to said spur gear, and said scoring means being positioned in a predetermined relationship with said ring gear, so that said stop means is rotatably positioned in said predetermined orientation relative to said scoring means as said mandrel is moved relative to said scoring means by said carousel, and said spur gear and said mandrel coaxially rotate.

8. A method of manufacturing a plastic closure in accordance with claim 6, including biasing said stop means radially of said mandrel from a first position of said stop means during said positioning of said closure in association with said mandrel assembly, to a second position in which said stop means engages said closure to stop rotation relative to said mandrel.

9. A method of manufacturing a plastic closure in accordance with claim 8, wherein said scoring step includes scoring said pilfer band between adjacent ones of a plurality of inwardly extending projections of said pilfer band by engaging said stop means with said closure between adjacent ones of said pilfer band projections to stop rotation of said closure relative to said mandrel.

10. A method of manufacturing a plastic closure in accordance with claim 5, wherein said scoring step includes vertically scoring said pilfer band between adjacent ones of a plurality of inwardly extending projections of said pilfer band.

* * * * *